United States Patent [19]

Burton et al.

[11] Patent Number: 5,599,581
[45] Date of Patent: Feb. 4, 1997

[54] METHOD FOR PNEUMATICALLY CONTROLLING DISCHARGE OF PARTICULATE MATERIAL

[75] Inventors: Charles A. Burton, Columbus; Douglas E. Boyd, Dublin; James S. Belt, Utica, all of Ohio

[73] Assignee: Owens Corning Fiberglas Technology, Inc., Summit, Ill.

[21] Appl. No.: 315,259

[22] Filed: Sep. 21, 1994

Related U.S. Application Data

[63] Continuation of Ser. No. 144,371, Nov. 2, 1993, abandoned.
[51] Int. Cl.[6] .................................. B65D 1/12; B65D 1/16
[52] U.S. Cl. ........................ 427/188; 427/197; 118/308; 222/152; 222/394; 141/67
[58] Field of Search ..................................... 427/180, 186, 427/187, 188, 197, 204; 118/308; 222/152, 394, 399; 141/67

[56] References Cited

U.S. PATENT DOCUMENTS

| | | |
|---|---|---|
| 1,472,227 | 10/1923 | Overbury . |
| 1,774,988 | 9/1930 | Maclean . |
| 2,163,757 | 6/1939 | Maclean et al. . |
| 2,359,029 | 9/1944 | Goldberg ................................. 141/67 |
| 2,605,036 | 7/1952 | Cozzoli . |
| 2,728,685 | 12/1955 | Muench . |
| 2,851,401 | 9/1958 | Payne . |
| 2,978,149 | 4/1961 | Rosen . |
| 2,979,235 | 4/1961 | Greaves . |
| 3,305,276 | 2/1967 | Weber . |
| 3,506,111 | 4/1970 | Eppenberger . |
| 3,586,069 | 6/1971 | Vest et al. ................................. 141/102 |
| 3,661,189 | 5/1972 | Bowser et al. . |
| 3,693,672 | 9/1972 | Hiland ........................................ 141/7 |
| 3,716,082 | 2/1973 | Green ......................................... 141/68 |
| 3,797,890 | 3/1974 | Walters ..................................... 141/83 |
| 3,837,540 | 9/1974 | Wagner . |
| 3,858,628 | 1/1975 | Bendle ....................................... 141/46 |
| 3,884,401 | 5/1975 | Winkler ................................... 222/544 |
| 3,964,793 | 6/1976 | Volpeliere ................................... 302/3 |
| 4,067,623 | 1/1978 | Klein et al. . |
| 4,178,974 | 12/1979 | Levin . |
| 4,212,331 | 7/1980 | Benatar ..................................... 141/67 |
| 4,427,040 | 1/1984 | Taylor . |
| 4,516,702 | 5/1985 | Schmidt . |
| 4,550,755 | 11/1985 | Vredenburg, Sr. . |
| 4,552,091 | 11/1985 | Feder ....................................... 118/620 |
| 4,573,504 | 3/1986 | Rosenström ............................. 141/59 |

(List continued on next page.)

FOREIGN PATENT DOCUMENTS

| | | |
|---|---|---|
| 107626 | 5/1984 | European Pat. Off. . |
| 125585 | 11/1984 | European Pat. Off. . |
| 224621 | 6/1987 | European Pat. Off. . |
| 2158813 | 11/1985 | United Kingdom . |

OTHER PUBLICATIONS

Pp. 1–7 of Chapter 1 "Fluidization Engineering," Second Edition, 1991, Kunii & Levenspiel.
Pp. 68–74 of Chapter 3 "Fluidization Engineering", Second Edition, 1991, Kunii & Levenspiel.
Brown, R. L. et al., Principles of Powder Mechanics, International Series of Monographs in Chemical Engineering, Pergamon Press, vol. 10, pp. 186–193 no date.

*Primary Examiner*—Shrive Beck
*Assistant Examiner*—David M. Maiorana
*Attorney, Agent, or Firm*—C. Michael Gegenheimer

[57] ABSTRACT

A method for dispensing or depositing particulate material includes accumulating particulate material in a nozzle having an opening at the bottom for discharging the particulate material, and applying positive air pressure to a buffer chamber positioned in communication with the accumulation of particulate material to start and control the flow of particulate material through the opening and applying negative pressure to the buffer chamber to stop the flow of particulate material. An unobstructed interface can exist between a surface of the particulate material and air in the buffer chamber. In one embodiment, roofing shingle granules are applied intermittently to a moving coated asphaltic sheet through a slot to form strip roofing shingles.

37 Claims, 4 Drawing Sheets

U.S. PATENT DOCUMENTS

| | | | |
|---|---|---|---|
| 4,583,486 | 4/1986 | Miller . | |
| 4,600,603 | 7/1986 | Mulder . | |
| 4,614,213 | 9/1986 | Englin | 141/59 |
| 4,688,610 | 8/1987 | Campbell | 141/83 |
| 4,735,241 | 4/1988 | Spiess | 141/68 |
| 4,738,287 | 4/1988 | Klinkel . | |
| 4,800,102 | 1/1989 | Takada . | |
| 4,815,414 | 3/1989 | Duffy et al. | 118/308 |
| 4,872,969 | 10/1989 | Sechrist . | |
| 4,873,937 | 10/1989 | Binder et al. | 118/44 |
| 4,943,163 | 7/1990 | Steele | 366/106 |
| 4,955,270 | 9/1990 | Volk, Jr. | 73/861.71 |
| 4,974,646 | 12/1990 | Martin et al. | 141/67 |
| 4,976,296 | 12/1990 | Pope . | |
| 5,016,687 | 5/1991 | Kawamura . | |
| 5,098,557 | 3/1992 | Hirschler et al. | 209/29 |
| 5,109,893 | 5/1992 | Derby | 141/67 |
| 5,234,037 | 8/1993 | Derby . | |
| 5,248,524 | 9/1993 | Soderland . | |
| 5,275,215 | 1/1994 | Derby . | |
| 5,323,819 | 6/1994 | Shade . | |

METHOD FOR PNEUMATICALLY CONTROLLING DISCHARGE OF PARTICULATE MATERIAL

This is a continuation, of application Ser. No. 08/144,371, filed on Nov. 2, 1993, now abandoned.

TECHNICAL FIELD

This invention pertains to dispensing particulate material, such as granular material. In one of its more specific aspects, this invention relates to controlling the application of particulate material to substrates.

BACKGROUND OF THE INVENTION

Various means have been employed in the past to dispense particulate materials. These materials can be rather coarse, as in granular material, such as shingle granules. There is also a need to dispense finely divided particulate material, such as powders. Typical means for dispensing particulate materials include direct feed nozzles and open hoppers.

Some processes require a periodic starting and stopping of the dispensing process. For example, dispensing particulate material into continuously indexing containers, and depositing particulate material onto substrates in patterns.

Where there is a need for starting and stopping the dispensing of the particulate materials, a mechanical means, such as a fluted roll, is usually inserted at the bottom of the nozzle. Rotation of the fluted roll causes a predetermined amount of the particulate material to be dropped through the nozzle opening.

There is a need for a more accurate way to control the dispensing of particulate material, particularly where the dispensing is to be intermittent. As process speeds increase it becomes more and more difficult to precisely control the starting and stopping of the discharge of particulate material. Mechanical devices have been found to be deficient in accurately starting and stopping the process.

Lack of precise control in a process for depositing particulate material onto a substrate results in an imprecise or fuzzy boundary between the applied portion of the substrate and the non-applied portion of the substrate. Lack of precise control in a process for depositing particulate material into containers, compartmented receptacles or packages passing beneath the nozzle manifests itself in spillage of the particulate material outside the containers.

One cause of the impreciseness of typical particulate material depositing techniques is that the nozzles depend on gravity exclusively, not only for directing the particulate material from the nozzle, but also for movement of the particulate material within the nozzle itself. The use of gravity to move the particulate material within the nozzle, or discharge apparatus itself, has feed rate limitations, and there is no easy way to control the rate of flow of the particulate material.

An improved means and method for dispensing particulate material from a nozzle would eliminate the lack of preciseness inherent in the mechanical action of mechanically operated apparatus, such as a fluted roll. Also, the ideal system would provide a means for enhancing gravitational forces in starting and stopping flow and would enable some means for controlling the flow rate of particulate material during discharge.

SUMMARY OF THE INVENTION

There is now been developed a particulate material discharge device which solves the problems of accurate, relatively instantaneous control of the flow of the particulate material. The method and apparatus of this invention starts, stops and controls the flow rate of particulate material by providing pneumatic pressure changes in a buffer chamber positioned adjacent a pile or an accumulation of the particulate material in a nozzle. The opening in the nozzle through which the material flows is sized with respect to the size of the particles so that slight pressure variations in the buffer chamber will start, accelerate or stop the flow of material through the nozzle opening.

According to this invention, there is provided apparatus for dispensing particulate material comprising a nozzle for holding an accumulation of particulate material, an opening at the bottom of the nozzle for discharging the particulate material onto the coated asphalt sheet, a buffer chamber positioned in communication with the accumulation of particulate material, and vacuum means for reducing the pressure in the buffer chamber to stop the flow of particulate material through the opening.

In a specific embodiment of the invention, pressure means, such as a fan, is also supplied to increase the air pressure in the buffer chamber to initiate a flow of particulate material through the opening. In a particular embodiment of the invention the pressure means comprises a pressure fan and a valve positioned between the pressure fan and the buffer chamber.

In yet another embodiment of the invention the accumulation of particulate material in the nozzle is supplied by a hopper, and the ratio of the height of the particulate material in the hopper to the height of the particulate material in the nozzle is greater than 1:1. In a particular embodiment of the invention the ratio is greater than or equal to about 3:1.

In yet another embodiment of the invention the vacuum means comprises a vacuum fan and a valve connecting negative gauge pressure air from the vacuum fan to the buffer chamber.

In another specific embodiment of the invention the opening is a slot. Most preferably, the slot, nozzle and buffer chamber are arranged transverse to the machine direction of the moving substrate, and a source of both pressurized air and negative gauge pressure air is connected to each end of the buffer chamber.

In a particular embodiment of the invention the opening is a slot having a width within the range of from about 0.06 to about 1.25 inches (about 0.15 to about 3.2 cm). Preferably, the width of the slot is within the range of from about 0.25 to about 0.75 inches (about 0.64 to about 1.9 cm).

In yet another embodiment of the invention flexible members are connected to the opening to help stop the flow of particulate material through the opening.

In yet another embodiment of the invention the size of the opening is within the range of from about 1.5 to about 20 times the average size of the particulate material. Preferably, the size of the opening is within the range of from about 3.0 to about 12 times the average size of the particulate material.

In a preferred embodiment of the invention the ratio of the area of the opening to the area of the surface of the accumulation of particulate material in the nozzle is greater than about 1:4.

According to this invention, there is also provided a method of dispensing particulate material comprising accumulating particulate material in a nozzle having an opening at the bottom for discharging the particulate material, and changing the air pressure in a buffer chamber positioned in communication with the accumulation of particulate material to control the flow of particulate material through the opening.

In a particular embodiment of the invention the step of changing the air pressure comprises reducing the pressure in the buffer chamber to stop the flow of particulate material through the opening. The air pressure in the buffer chamber is preferably decreased to a pressure within the range of about −5 to about −10 inches of water gauge pressure (about −9.3 to about −37.3 mm Hg) to stop the flow of particulate material through the opening.

In yet another embodiment of the invention the step of changing the air pressure comprises increasing the air pressure in the buffer chamber to initiate a flow of particulate material through the opening, and reducing the pressure in the buffer chamber to stop the flow of particulate material through the opening.

In a specific embodiment of the invention, the flow rate of particulate material through the opening is changed to accommodate changes in the speed of a substrate.

In yet another embodiment of the invention, a control means, operatively connected to the supply of pressurized air to the buffer chamber, is operated to vary the flow rate of particulate material through the opening to accommodate changes in the speed of moving containers or a moving substrate.

In an additional embodiment of the invention, the size of the opening is changed to vary the flow rate of particulate material through the opening to accommodate changes in the speed of moving containers or a moving substrate.

DETAILED DESCRIPTION OF THE INVENTION

For purposes of illustration this invention will be described in terms of a process for dispensing shingle granules onto a coated asphalt sheet to form strip roofing shingles. It is to be understood that the invention encompasses dispensing many other kinds of particulate material, such as inorganic particles like powders, frits, spheres, pellets, and microspheres. Also encompassed are organic particles, such as powders, spheres, microspheres, grains, seeds, etc.

Figure 1:
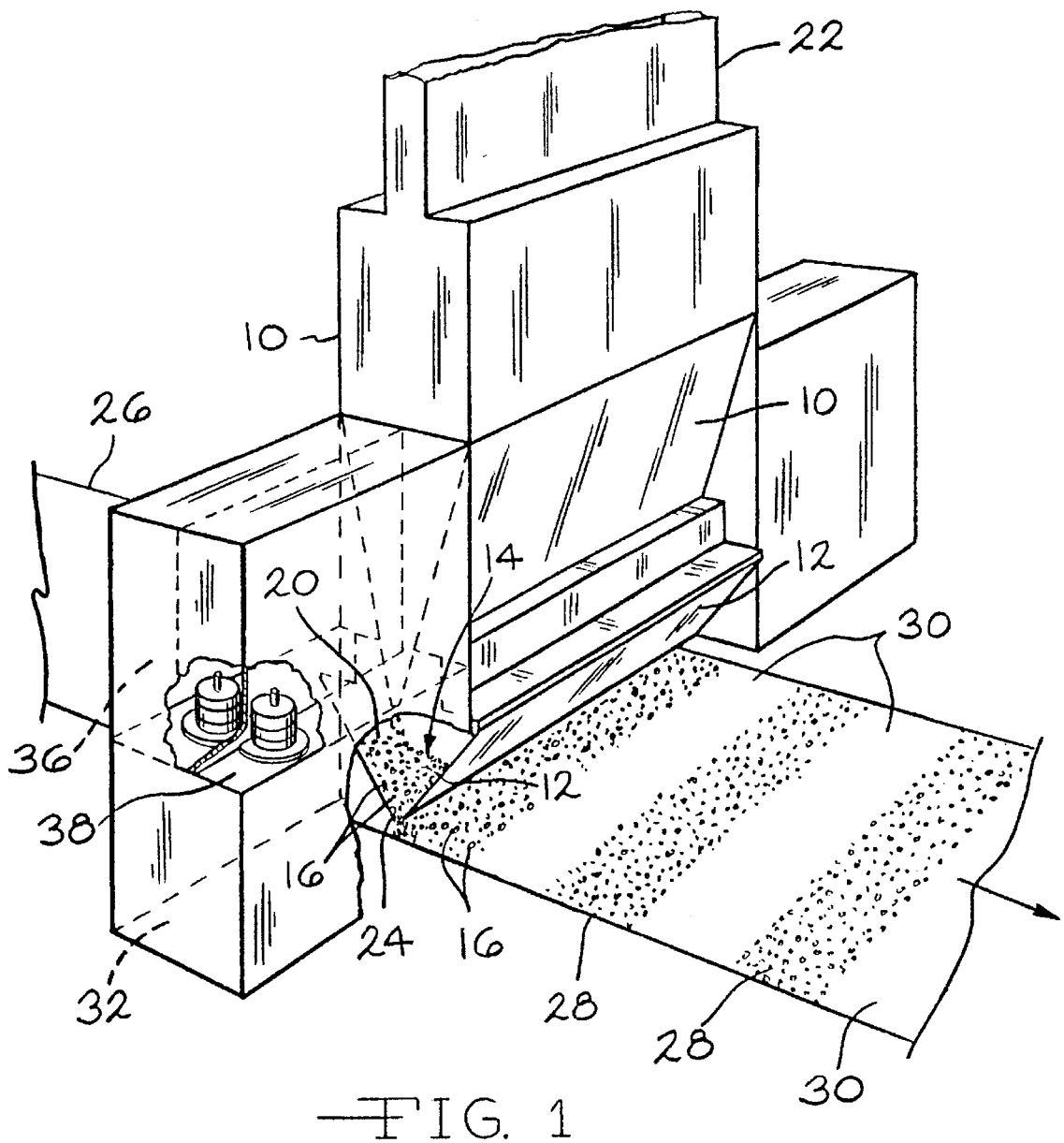
FIG. 1 is a schematic view in perspective of apparatus for dispensing granules according to the principles of the invention.
Figure 2:
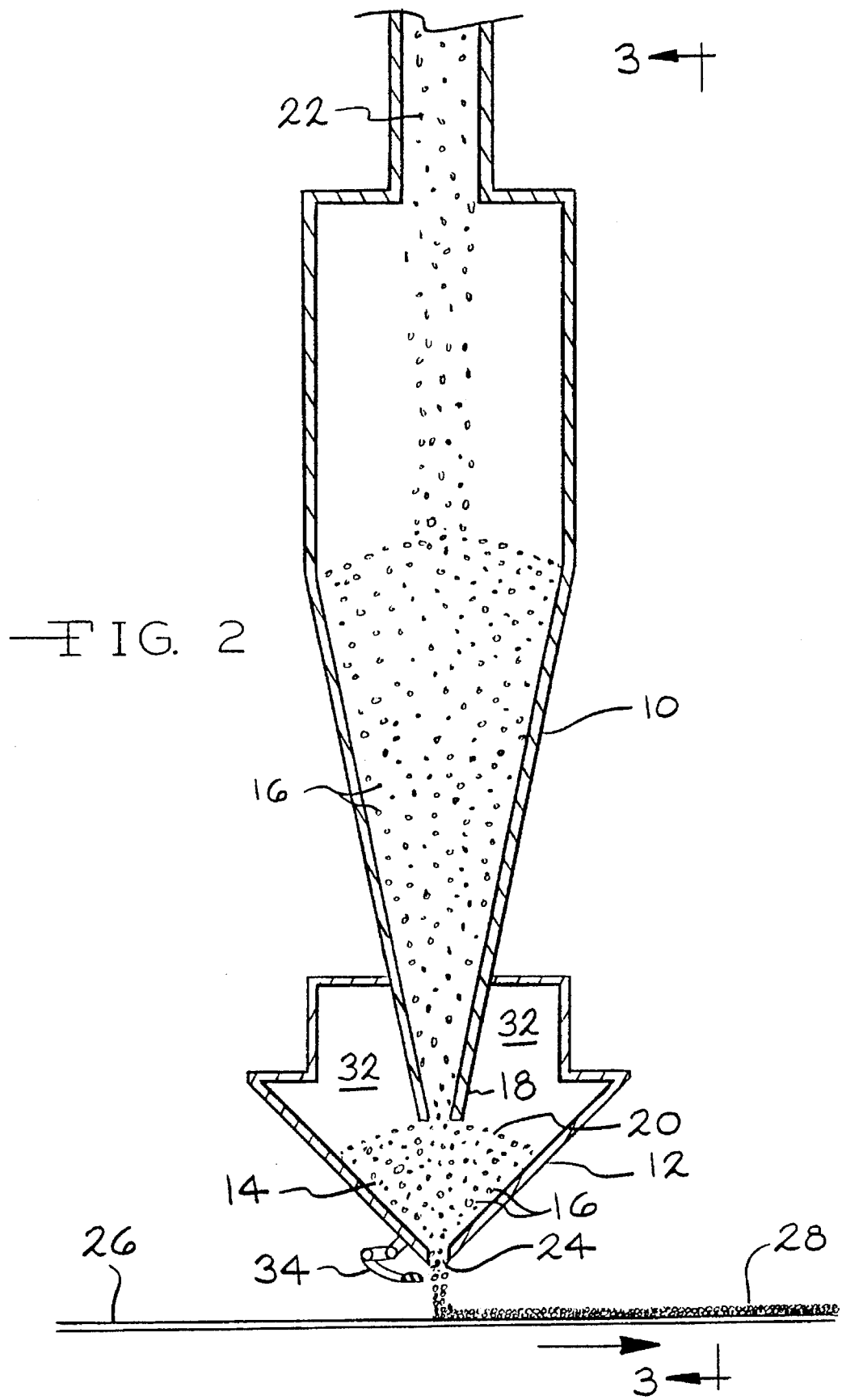
FIG. 2 is a schematic view in elevation of a cross section of the granule dispensing apparatus of FIG. 1.

As shown in FIGS. 1 and 2, the apparatus for dispensing particulate material is generally comprised of hopper 10 and nozzle 12. The hopper can be any suitable means for supplying granules to the nozzle to form a pile or accumulation 14 of granules 16. The exit or throat 18 of the hopper narrows down to be considerably smaller in cross-sectional area than surface area 20 of the accumulation of granules. The surface of the accumulation of granules is the interface between the granules and the air in the buffer chamber.

Granules can be fed to the hopper by any suitable means, such as granule feeder 22, many designs for which are well known in the art. When the granules exit the nozzle they exit through an opening, such as slot 24 and are deposited on moving coated asphalt sheet 26. The granules are deposited onto the sheet in an intermittent manner to form a series of prime granule application areas or blend drops 28 which are separated by a series of background color areas, such as background color areas 30. Usually the background color granules are dropped onto the coated asphalt sheet after the blend drops are deposited, as is well known in the art.

Figure 4:
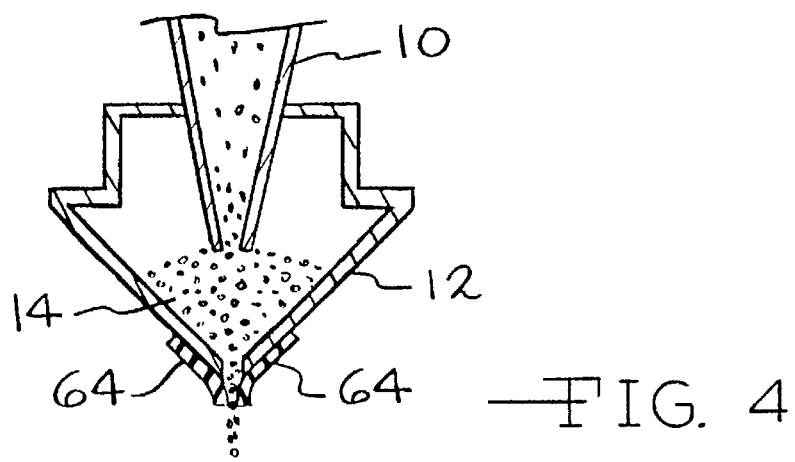
FIG. 4 is a schematic cross-sectional view in elevation illustrating the use of flexible flaps on the nozzle of the invention.

As shown in FIGS. 2 and 4 in particular, granules 16 fed from feeder 22 form a head within hopper 10. That head provides a relatively constant feed via gravity discharge to the accumulation 14 of granules formed within the nozzle. That is, as a flow of granules 16 is discharged from the accumulation 14 through slot 24, a like volume of granules automatically is supplied to the accumulation 14 by gravity flow from the hopper 10. As shown in FIGS. 2 and 4, the outlet of the hopper 10 contacts the accumulation surface 20. Granules will initially flow into the accumulation 14 until the surface 20 reaches the level of the hopper outlet, plugging the same against further flow. This is a well known plug-feed type of supply, which is used herein to maintain the volume of the accumulation 14 relatively constant. The preferred ratio of the head to the accumulation of granules is discussed in more detail hereafter.

It should be understood that the invention encompasses apparatus for dispensing particulate material for any purpose, including filling containers. It is not necessary that the particulate material be deposited onto a moving substrate.

As shown more clearly in FIG. 2, there is an open area, buffer chamber 32, positioned above the surface of the accumulation of granules in the nozzle. It is changes in the pressure of the buffer chamber which affect the flow of granules through the slot. It is to be understood that the buffer chamber is positioned adjacent the accumulation of granules in the nozzle. It need not necessarily be positioned above the granules. Also, a screen or perforated plate can be positioned at the surface of the accumulation of granules to separate the buffer chamber from the accumulation of granules. In FIG. 2, and unobstructed interface free of a screen or perforated plate exists between a surface of the particulate material and air in the buffer chamber.

During the start up of the granule application process, it may be necessary to close off the slot in the nozzle to provide sufficient back pressure to enable the granules to be stopped from flowing through the nozzle. Accordingly, a means, such as start-up plug 34, is provided to temporarily plug the slot during initiation of the process.

Figure 3:
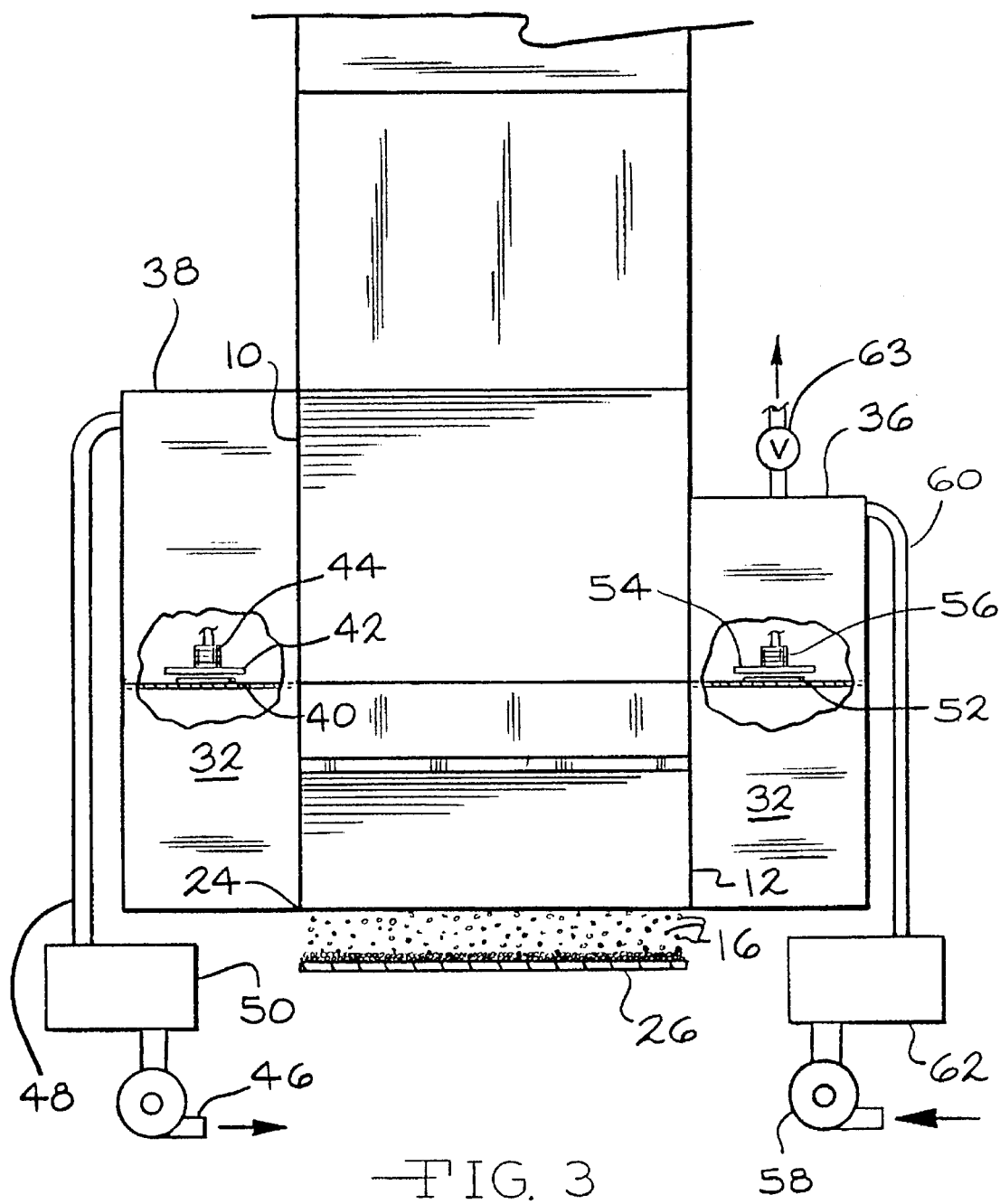
FIG. 3 is a schematic view in elevation of the granule dispensing apparatus of claim 2 taken along lines 3—3.

As shown in FIG. 3, the buffer chamber can be adapted to extend beyond either end of the nozzle, so that the buffer chamber is in communication with the top surface of the accumulation of granules in the nozzle. Positioned in communication with the buffer chamber are two other chambers which affect the pressure within the buffer chamber. These are pressure chamber 36 and vacuum chamber 38. The vacuum chamber is in communication with the buffer chamber through any suitable means, such as vacuum opening 40.

The flow of air from the buffer chamber to the vacuum chamber can be controlled by any suitable device, such as by vacuum plate 42 operated by vacuum solenoid 44. Any means, such as vacuum fan 46, can be put in communication with the vacuum chamber in order to produce a negative gauge pressure in the vacuum chamber. A vacuum fan is not the only possibility for creating the negative pressure within the vacuum chamber. Other devices include the use of a venturi or a pump.

The vacuum fan is operatively connected to the vacuum chamber by any suitable conduit, such as vacuum piping 48. Further, an accumulator, such as vacuum accumulator 50, can be used to dampen surges in demand and supply of the negative gauge pressure air. It can be seen that the opening and closing of the vacuum plate against the vacuum opening by action of the vacuum solenoid will affect the communication between the negative gauge pressure vacuum chamber and the buffer chamber. The application of negative gauge pressure to the buffer chamber will create a sufficient pressure drop over the accumulation of granules to stop the flow of granules through the slot.

When a negative pressure is applied to the vacuum chamber and through the vacuum opening to the buffer chamber, there is produced an upward flow of air through the slot and through the granules that have accumulated in the nozzle. The upward flow of air provides an upwardly oriented drag force on the granules in contrast to the downward pull of gravity on the granules. If the proper amount of negative pressure is applied to the buffer chamber, the drag force from the upward flow of air through the slot will balance the pull of gravity on the granules, and the granules will be held in place rather than continue falling down through the slot. The granules are held in place by the upward flow of air.

It should understood that if the velocity of the air flow through the slot exceeds a critical level, then the granules would become fluidized, and begin to move as if they were caught in a fluid medium. Fluidization of the granules means that the granules are not held in place, but are supported with sufficient drag force of upwardly moving air that they are free to vibrate or move laterally relative to each other. The fluidization of the granules within the nozzle would create churning, mixing and various air flow paths which would contain some entrained granules. If the air flow is of sufficient velocity to cause fluidization of the granules, some of the granules would fall through the nozzle. Therefore, the amount of upward air flow through the nozzle must be carefully balanced so that the drag force exceeds the weight of the granules to prevent the granules from falling without causing fluidization of the granules.

Another problem of fluidization can occur if upward air velocity at the surface of the accumulation of the granules creates drag force sufficient to cause some of the granules to become airborne. Airborne granules can foul the air handling system.

In a manner similar to the equipment shown on the vacuum side, the pressure chamber is in communication with the buffer chamber by means of pressure opening 52, and this can be controlled with any suitable device, such as pressure plate 54 operated by pressure solenoid 56. The pressure in the pressure chamber can be supplied by any suitable means, such as pressure fan 58 connected via pressure conduit 60, and employing pressure accumulator 62. It is to be understood that any number of mechanisms can be used to supply pressure to the pressure chamber, such as pumps, turbines, or bellows. It can be appreciated that the pressure plate acts as a valve between the pressure fan and the buffer chamber. Likewise, the vacuum plate acts as a valve to control the process of reducing the pressure in the buffer chamber used to stop the flow of granules through the slot. Another means for controlling the pressure in the pressure chamber is by using pressure relief valve 63.

In operation it has been found preferable to have sufficient height of the hopper relative to the height of the accumulation of granules in the nozzle so that pressure changes in the buffer chamber are communicated primarily to the granules in the nozzle, rather than to the granules in the hopper. Preferably, the ratio of the height of the granules in the hopper to the height of the granules in the nozzle is greater than 1:1. Most preferably, the ratio is greater than or equal to about 3:1. If the ratio were lower than about 1:1 negative pressure in the buffer chamber would have the effect of drawing air through the granules in the hopper rather than through the granules in the accumulation in the nozzle. This would mean that the application of negative pressure in the buffer chamber would be ineffective in stopping the flow of granules passing through the slot.

As shown in FIG. 3, there is a source of pressurized air at one end of the apparatus, and a source of negative gauge pressure air connected to the other end of the buffer chamber. Where shingles of sufficient width are being produced, such as on a 3-wide machine or a 4-wide machine, it is preferable to have a source of both pressurized air and negative gauge pressure air connected to each end of the buffer chamber. This would reduce the possibility of a time delay in having the effect of a change in air pressure cross the width of the shingle manufacturing machine.

The size of the width of the slot depends in part upon the size of the granules used. For granules sized as 3M No. 11 grade roofing granules, the preferred slot has a size within the range of from about 0.06 to about 1.25 inches (about 0.15 to about 3.2 cm). Most preferably, the width of the slot is within the range of from about 0.25 to about 0.75 inches (about 0.64 to about 1.9 cm).

In order to most completely close off the slot when the granules are supposed to be stopped, it is preferable to use flexible members, such as thin stainless steel flaps 64 to help stop the flow of granules through the slot, as shown in FIG. 4. The flexible members can be of any suitable type, sufficient to allow the flow of granules during the time when the granules are supposed to be flowing.

Figure 5:
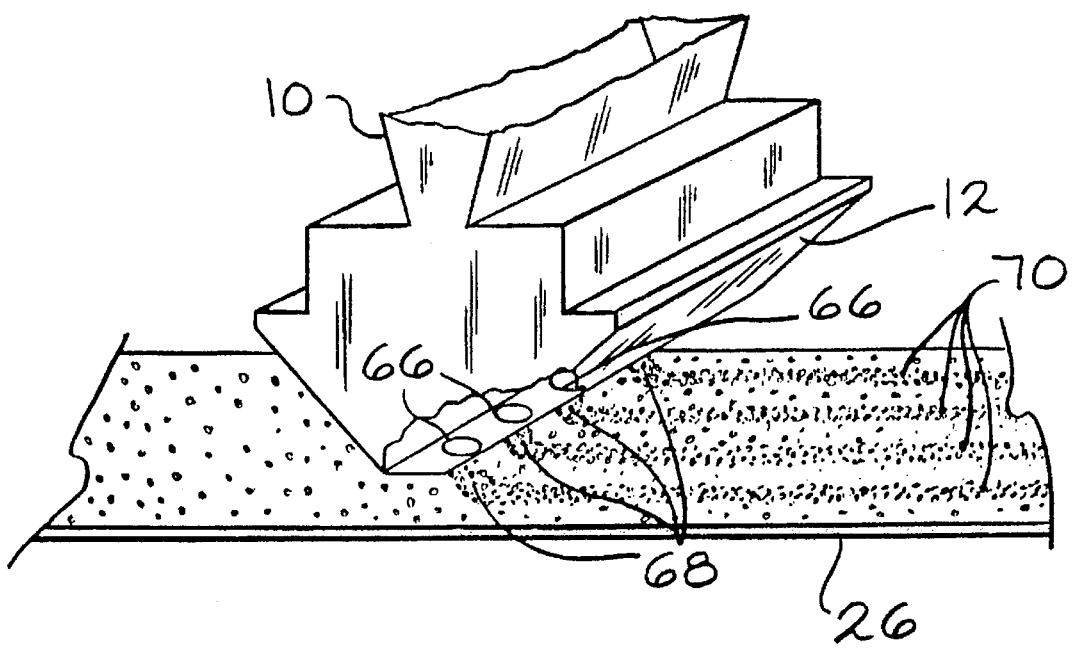
FIG. 5 is a schematic view in perspective illustrating an embodiment of the invention using a series of orifices rather than a slot in the dispensing nozzle.

It should be understood that the shape of the opening for discharging the particulate material need not be a slot. As shown in FIG. 5, the openings can be of different shapes, such as round or oval openings 66. As can be appreciated, a series of such oval openings would create a series of particulate material streams, such as granule streams 68. These granule streams could be used to produce particularly desired patterns of discreet granules, such as discreet granule patterns 70.

It has been found that the surface area of the accumulation of particulate material has a critical relationship with the area of the opening. This is because if the area of the surface of accumulation of particulate material is too small, the negative pressure will create a fluidized bed situation in which the particulate material is actually floating on the air, and this would interrupt the smooth processing of the apparatus. Preferably the ratio of the area of the opening to the area of the surface of accumulation of particulate material in the nozzle is greater than about 1:4.

It will be evident from the foregoing that various modifications can be made to this invention. Such modifications, however, are considered as being within the scope of the invention.

INDUSTRIAL APPLICABILITY

This invention will be found to be useful in the production of granule coated discreet roofing shingles suitable for use in residential and commercial roofing applications.

We claim:

1. The method of dispensing particulate material comprising establishing an accumulation of particulate material in a nozzle having an opening at the bottom for discharging the particulate material, establishing a buffer chamber in communication with the accumulation of particulate material such that an unobstructed interface exists between a surface of the particulate material and air in the buffer chamber, and changing the air pressure in the buffer chamber to control a flow of particulate material through the opening.

2. The method of claim 1 in which the step of changing the air pressure comprises decreasing the air pressure to stop the flow of particulate material through the opening.

3. The method of claim 2 in which the decreased air pressure creates an upward flow of air through the particulate material at the opening, the flow of air being sufficient to prevent the particulate material from flowing down through the opening by gravity, but insufficient to create fluidization of the particulate material.

4. The method of claim 2 in which the air pressure in the buffer chamber is decreased to a pressure within the range of about −1 to about −10 inches of water gauge pressure (about −1.9 to about −37.3 mm Hg) to stop the flow of particulate material through the opening.

5. The method of claim 1 in which the step of changing the air pressure comprises increasing the air pressure in the buffer chamber to initiate a flow of particulate material through the opening, and reducing the pressure in the buffer chamber to stop the flow of particulate material through the opening.

6. The method of claim 5 in which the air pressure in the buffer chamber is increased to a pressure within the range of about 1 to about 20 inches of water gauge pressure (about 1.9 to about 37.3 mm Hg) to initiate the flow of particulate material through the opening, and decreased to a pressure within the range of about −1 to about −10 inches of water gauge pressure (about −1.9 to about −37.3 mm Hg) to stop the flow of particulate material through the opening.

7. The method of claim 1 in which a supply of pressurized air is connected to the buffer chamber, and further comprising varying the pressure of the pressurized air with a control means being positioned between the supply of pressurized air and the buffer chamber to control the flow rate of particulate material through the opening.

8. The method of claim 1 in which a supply of pressurized air is connected to the buffer chamber, and further comprising operating a control means, operatively connected to the supply of pressurized air to the buffer chamber, to vary the flow rate of particulate material through the opening.

9. The method of claim 1 comprising changing the size of the opening to vary the flow rate of particulate material through the opening.

10. The method of applying particulate material to a substrate comprising establishing an accumulation of particulate material in a nozzle having an opening at the bottom for discharging the particulate material onto the substrate, establishing a buffer chamber in communication with the accumulation of particulate material such that an unobstructed interface exists between a surface of the particulate material and air in the buffer chamber, and changing the air pressure in the buffer chamber to control a flow of particulate material through the opening onto the substrate.

11. The method of claim 10 in which the step of changing the air pressure comprises decreasing the air pressure to stop the flow of particulate material through the opening.

12. The method of claim 11 in which the decreased air pressure creates an upward flow of air through the particulate material at the opening, the flow of air being sufficient to prevent the particulate material from flowing down through the opening by gravity, but insufficient to create fluidization of the particulate material.

13. The method of claim 11 in which the air pressure in the buffer chamber is decreased to a pressure within the range of about −1 to about −10 inches of water gauge pressure (about −1.9 to about −37.3 mm Hg) to stop the flow of particulate material through the opening.

14. The method of claim 10 in which the step of changing the air pressure comprises increasing the air pressure in the buffer chamber to initiate a flow of particulate material through the opening, and reducing the pressure in the buffer chamber to stop the flow of particulate material through the opening.

15. The method of claim 14 in which the air pressure in the buffer chamber is increased to a pressure within the range of about 1 to about 20 inches of water gauge pressure (about 1.9 to about 37.3 mm Hg) to initiate the flow of particulate material through the opening, and decreased to a pressure within the range of about −1 to about −10 inches of water gauge pressure (about −1.9 to about −37.3 mm Hg) to stop the flow of particulate material through the opening.

16. The method of claim 10 in which the substrate is moving beneath the nozzle, and further comprising changing the flow rate of particulate material through the opening in response to changes in the speed of the substrate.

17. The method of claim 16 in Which a supply of pressurized air is connected to the buffer chamber, and further comprising varying the pressure of the pressurized air to control the flow rate of particulate material through the opening in response to changes in the speed of the substrate.

18. The method of claim 17 comprising varying the pressure of the pressurized air with a control means being positioned between the source of pressurized air and the buffer chamber to control the flow rate of particulate material through the opening in response to changes in the speed of the substrate.

19. The method of claim 10 in which the substrate is moving beneath the nozzle, and in which a supply of pressurized air is connected to the buffer chamber, and further comprising operating a control means, operatively connected to the supply of pressurized air to the buffer chamber, to vary the flow rate of particulate material through the opening in response to changes in the speed of the substrate.

20. The method of claim 10 in which the substrate is moving beneath the nozzle, and further comprising changing the size of the opening to vary the flow rate of particulate material through the opening in response to changes in the speed of the substrate.

21. The method of dispensing particulate material comprising:

establishing an accumulation of particulate material in a nozzle having an opening at the bottom for discharging the particulate material, said accumulation having a top surface within said nozzle, establishing a buffer zone in communication with said accumulation of particulate material at said top surface, discharging a flow of particulate material from said accumulation through said nozzle opening, and changing the air pressure in said buffer zone to control the flow of particulate material through said nozzle opening, the air pressure being rapidly decreased in said buffer zone in a first mode of operation to thereby generate an airflow through said nozzle opening and into said accumulation whereby the flow of particulate material through said nozzle opening is quickly stopped, said airflow being selected to maintain particulate material forming said surface of said accumulation substantially unentrained in said airflow and to maintain said particulate material in said accumulation in a substantially unfluidized state.

22. The method of claim 21 in which an air pressure modifying apparatus for effecting a change of air pressure is connected to said buffer zone, and wherein said step of changing the air pressure further comprises controlling said air pressure modifying apparatus to vary said airflow through said nozzle opening to thereby vary a flow rate of particulate material through said nozzle opening.

23. The method of claim 22 in which the step of changing the air pressure further comprises controlling said air pressure modifying apparatus in a second mode of operation to cause said air pressure modifying apparatus to increase the air pressure in said buffer zone to forcibly discharge particulate material through said nozzle opening.

24. The method of dispensing particulate material comprising the steps of:

establishing an accumulation of particulate material in a discharge device having a discharge opening, said accumulation having a top surface of unconstrained particulate material;

establishing an air buffer zone which is in communication with said top surface of said accumulation of particulate material;

discharging a flow of particulate material from said accumulation through said discharge opening, and changing the air pressure in said buffer zone to effect airflow along an airflow path through said accumulation which is generally coincident with a discharge flow path to thereby, in a first mode of operation, control a flow of particulate material through said discharge opening by rapidly stopping the flow of particulate material through said discharge opening without substantial entrainment of particulate material from said top surface in said airflow.

25. The method of dispensing particulate material comprising the steps of:

establishing an accumulation of particulate material in a vessel having a discharge opening, said accumulation having a top surface area of unconstrained particulate material, and said accumulation forming a weight of particulate material at said discharge opening;

establishing an air buffer zone which is in communication with said accumulation top surface area;

discharging a flow of particulate material from said accumulation through said discharge opening, and rapidly changing the air pressure in said buffer zone to generate a modifying airflow having a drag force parallel to a discharge flow path followed by said particulate material as said particulate material flows through said vessel to thereby control the flow of particulate material through said discharge opening, which modifying airflow is selected in a first mode of operation to substantially prevent entrainment of particulate material forming said top surface area in said modifying airflow while substantially immediately stopping particulate material discharge through said discharge opening, said modifying airflow being selected in said first mode with a drag force sufficient to suspend said weight of particulate material.

26. The method of dispensing particulate material comprising the steps of:

establishing a reservoir of particulate material in a container having a discharge opening for dispensing on a substrate;

maintaining said reservoir at a substantially constant volume throughout dispensing by providing an uninterrupted supply of particulate material to said reservoir;

establishing an air flow along an air path extending through said discharge opening which air flow is in contact with said particulate material in said reservoir along a discharge path defined by a flow of particulate material through said container;

discharging a flow of particulate material from said reservoir through said discharge opening; and changing the rate of air flow through said discharge opening to thereby control said flow of particulate material through said discharge opening.

27. The method of dispensing particulate material comprising the steps of:

establishing an accumulation of particulate material in a vessel having a discharge opening, which accumulation has a top surface area, and maintaining said accumulation;

establishing an air buffer zone in communication with said top surface area;

discharging a flow of particulate material from said accumulation through said discharge opening, and reducing the air pressure in said buffer zone to generate an airflow through said discharge opening and through said accumulation which mixes with said particulate material and follows an airpath generally parallel with a discharge flow path of said particulate material as said particulate material flows through said vessel and in a direction opposite to said discharge flow path to thereby control said flow of particulate material through said discharge opening, said airflow through said discharge opening being adjusted at a maximum to prevent the particulate material from flowing through said discharge opening without substantial entrainment of particulate material from said top surface area in said airflow.

28. A method for dispensing particulate material onto a substrate moving past the dispenser comprising the steps of:

providing a nozzle having an elongated slot at the bottom of the nozzle for discharging the particulate material, establishing an accumulation of the particulate material in the nozzle, said accumulation having a top surface area of unconstrained particulate material, said accumulation forming a weight of particulate material in the bottom of said nozzle at said slot, providing a buffer chamber positioned in communication with said top surface area of said accumulation of particulate material, and providing a vacuum source for reducing air pressure in said buffer chamber, discharging a flow of particulate material from said accumulation through said slot onto said substrate, and rapidly stopping the flow of particulate material through said slot by controlling said vacuum means to effect an airflow through said nozzle and into said accumulation sufficient to create a fluid drag to suspend the weight of particulate material at said slot in a first mode of operation.

29. The method of claim 28 in which said slot is arranged transverse to a path defined by the moving substrate, and further including a source of pressurized air for increasing air pressure in said buffer chamber, said source of pressurized air in a second mode of operation assisting discharge of particulate material through said slot by applying a fluid force to said accumulation flowing through said accumulation and out said slot.

30. A method for dispensing particulate material having a fast discharge cut-off, comprising the steps of:

providing a vessel with a discharge opening defined therein, supplying particulate material to said vessel to establish an accumulation of particulate material in said vessel which accumulation has a top surface area spaced from said discharge opening, with said supplying step further including maintaining said accumulation;

providing an air buffer chamber which encloses said accumulation top surface area;

discharging a flow of particulate material from said accumulation through said discharge opening; and rapidly generating and controlling via said buffer chamber an airflow through said accumulation which airflow follows an airpath generally parallel with a discharge flow path for said particulate material, said airflow in one mode of operation being generated by reducing air pressure in said buffer chamber to create a reverse airflow along said airpath in a direction opposite to said discharge flow path and counter to a flow of particulate material through said discharge opening, said reverse airflow through said discharge opening being controlled to rapidly stop particulate material from flowing through said discharge opening in said one mode of operation.

31. The method of claim 30 wherein said step of generating and controlling an airflow includes a second mode of operation wherein air pressure in said buffer chamber is increased to assist discharge of particulate material through said discharge opening.

32. A method of dispensing particulate material comprising the steps of:

providing a container for holding an accumulation of particulate material, said container having a discharge opening through which said particulate material is dispensed along a discharge path onto a substrate;

supplying particulate material to said container to establish an accumulation of particulate material in said container, and further in response to removal of particulate material through discharge so as to substantially maintain said accumulation at a constant volume;

discharging a flow of particulate material from said accumulation through said discharge opening; and generating and controlling an air flow through said accumulation which air flow is mixed with said particulate material and follows an air flow path extending along said discharge path, to thereby control a flow of particulate material through said discharge opening.

33. A method for dispensing particulate material comprising the steps of:

providing a container for holding an accumulation of particulate material, said container having a discharge opening through which said particulate material is dispensed along a discharge path, said accumulation having a top surface defined by particulate material in said container which is spaced from said discharge opening;

providing a housing defining an air buffer zone enclosing said top surface;

providing means for changing air pressure in communication with said air buffer zone;

discharging a flow of particulate material from said accumulation through said discharge opening; and generating and controlling air pressure in said air buffer zone to thereby effect a flow of air through said discharge opening and along said discharge path to control a flow of particulate material through said discharge opening, including one mode of operation wherein air pressure in said air buffer zone is rapidly reduced to create an airflow along said discharge path to draw air through said discharge opening into said container, said airflow through said discharge opening being controlled to rapidly stop particulate material from flowing through said discharge opening in said one mode of operation.

34. The method of claim 33 further including a second mode of operation of generating and controlling air pressure wherein air pressure in said air buffer zone is increased to assist a flow of particulate material through said discharge opening.

35. The method of claim 34 in which said means for changing air pressure comprises a fan and a valve positioned between said fan and said air buffer chamber, said valve being operated to place said fan in fluid communication with said air buffer chamber.

36. The method of claim 34 in which said discharge opening is an elongated slot, said slot being arranged in use transverse to a machine direction of a moving substrate defined by a path followed by said moving substrate, and said means for changing air pressure comprises a source of pressurized air and a source of negative gauge pressure air which are both connected to said buffer zone.

37. The method of claim 34 in which said airflow creates an upward flow of air through said particulate material at said discharge opening sufficient to prevent said particulate material from flowing down through said discharge opening by gravity, but insufficient to create fluidization of said particulate material.

* * * * *